June 15, 1965 W. J. MORONEY 3,189,799

SEMICONDUCTOR DEVICES AND METHOD OF FABRICATING THEM

Filed June 14, 1961

INVENTOR.
WILLIAM J. MORONEY
BY [signature]
ATTORNEY

United States Patent Office 3,189,799

Patented June 15, 1965

3,189,799

SEMICONDUCTOR DEVICES AND METHOD OF FABRICATING THEM

William J. Moroney, Wenham, Mass., assignor to Microwave Associates, Inc., Burlington, Mass., a corporation of Massachusetts Filed June 14, 1961, Ser. No. 117,034
7 Claims. (Cl. 317—234)

This invention relates to semiconductor devices and more particularly to improvements in the reliability thereof.

It is already well established that the reliability of component parts is a critical factor in the development of electronic systems which can be depended upon to perform their assigned tasks. If the reliability of a given component is such that only one in ten thousand will fail during a six-months' storage period, or during an hour's operation of ten thousand of them, this reliability might be acceptable in systems employing only one or two of the component per system. It is not acceptable in systems employing ten thousand of the component per system, for the obvious reason that such systems must inevitably fail during the first hour of operation or during the first six months of inactive existence, and when they do fail, they present the problem of locating the one component in ten thousand which has failed.

Large scale electronic systems employing semiconductor devices by the thousands and even tens of thousands are now common. Such systems, as exemplified by large scale digital computers, first came into use under conditions which retained the possibility of making repairs to them in their working environment. The ability to locate and replace failed components in a minimum time is an essential service which must be provided with these systems in order to hold their "down time" to a minimum and provide their use for economically acceptable costs. At the present time, the use of large scale computers is limited to situations in which relatively high service charges can be tolerated, in large part because of lost, or "down" time due to component failures.

More recently electronic systems are being used in environments where repair service is not available during operation. Thus, a system in a missile must have absolute reliability for the short period of time during which it is in use, while a system in a satellite or space vehicle must have absolute reliability for a period of time extending to months, or even years. In order to assure the longest possible reliability of such systems in use, they are frequently kept under constant, or repeated supervision and repair on the ground, until just prior to their use. As a result, tremendous quantities of ground support equipment must be provided for missiles, rockets, satellites, and space vehicles. This ground support equipment includes electronic systems, which also are subject to failure and must be serviced in the same way as other ground-based systems. The problems attendant upon component failure are thus seen to be cumulative, and in many situations, they are critical.

It is the principal and general object of this invention to provide semiconductor devices having superior reliability. More particularly, objects of the invention are to provide semiconductor devices which are:

(a) Of such high reliability that they are not damaged during their assembly into systems under normal assembly conditions; and (b) Of such high reliability that they can be stored indefinitely without any measurable deteriorations; and (c) Of such high reliability that they will not fail in use throughout the expected life of the system in which they are incorporated.

A further object of the invention is to provide semiconductor devices of the aforesaid high reliability which can be made in packages of acceptably small size and ruggedness, and preferably, in packages of the kind already in use with prior, less reliable, devices. Another object of the invention is to provide such highly reliable devices which can be made with straightforward techniques, by workers having existing fabrication skills, and at manufacturing costs which are competitive with the costs of manufacturing prior less reliable semiconductor devices.

According to the invention, a semiconductor device comprising a body of electronic semiconductor material and two or more electrodes in contact therewith is provided with a coat of glass hermetically bonded to the exterior of the semiconductor at least in the region of contact with one of the electrodes, this electrode passing through the glass coating and being supported, and in some embodiments held in contact with the semi-conductor body by the glass coat structure. A housing is provided surrounding the semiconductor body and glass coat, and hermetically bonded to the electrodes which pass through the housing. The housing may also be made of glass and in this case, the glass of the housing preferably has a higher working temperature than the glass of the coat clad to the semiconductor body.

In a particular embodiment of a semiconductor device hereinafter described in detail, the housing is a tubular standard glass package about ⅛ inch in outer diameter and ⅜ inch in coaxial length, and a mesa-type semiconductor die having an etched junction is the semiconductor body. The housing is available, or first prepared in two parts, one being the so-called "first seal" case comprised of the tubular housing open at one end and a first electrode sealed in and through the other end. The other part is a second electrode on which an annular glass bead is sealed intermediate the ends and which bears at one end an elongated spring contact electrode, extending therefrom. The free end of the spring contact electrode is brought into contact with the surface of the mesa, which preferably has been suitably prepared. The contact electrode is held there with a suitable jig, a glass frit is applied, the heat is applied to melt the frit and form a glass coat, or first housing, hermetically bonded to the mesa and the end of the contact electrode in contact therewith. The composition of the glass frit, the method of forming the glass coat bonded to the semiconductor body and contact electrode, and the particular type of contact may be as described in any of the following copending applications, which are all assigned to the assignee of the present application:

Serial No. 69,792, filed November 14, 1960;
Serial No. 67,293, filed November 4, 1960; and
Serial No. 67,294, filed November 4, 1960.

The base of the semiconductor mesa body is left free of the glass coat, and is mounted on a suitable metal base plate. The entire subassembly with the second electrode bearing the glass bead attached is then inserted in the first seal case through the open end with the metal base confronting the end of the first electrode therein. A solder pellet is interposed between this end and the metal base plate, and heat is applied to solder the base plate and electrode end together. The bead is then fused to the glass of the open end of the tubular housing, to complete the device. Semiconductor diodes constructed according to this embodiment of the invention have proved to possess unusually good reliability characteristics, as will be further set forth.

Other and further embodiments and features of the invention will become apparent from the following description of certain embodiments thereof, and of the methods used to make them. This description refers to the accompanying drawings, wherein.

Figure 1:
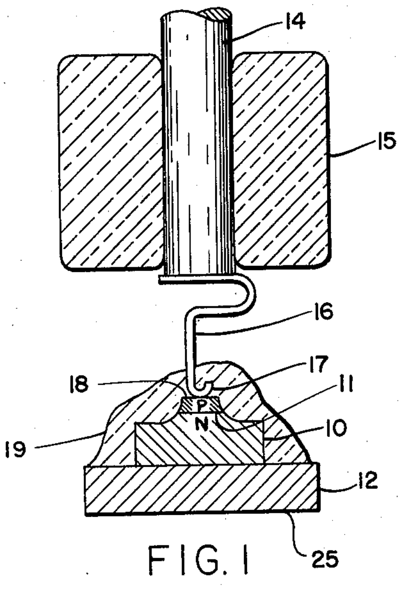
FIG. 1 illustrates in longitudinal section a subassembly of a semiconductor diode according to the invention.

Referring now to FIG. 1, a mesa-type semiconductor die 10, which may be of silicon, for example, having a junction 11 between regions of P-type and N-type material, is mounted on a base or carrier 12. The carrier may be made of "Kovar," an alloy of iron, nickel and cobalt, or molybdenum, for example, and the die may be mounted thereon by means of a gold-silicon eutectic solder (not shown) having a melting point of about 370° C. An electrode 14 surrounded by a glass bead 15 (to be described more particularly below) has a spring contact conductor 16 attached at one end to its end. The spring contact conductor may be made of a resilient ribbon or wire, for example a tungsten wire 3 mil. inches in diameter. The spring contact conductor has, in the present embodiment, a curved free end 17 adapted to make contact with the top 18 of the mesa portion of the die 10. The electrode 14, glass bead 15 and spring contact conductor 16 form a subassembly which is sometimes known in the art as a "beaded lead." A housing 19 of glass surrounds the die 10 and the portion of the end of the spring contact conductor 16 containing the curved free end 17. This housing is hermetically sealed directly to these elements and holds them in mechanical and electrical contact with each other.

The beaded lead subassembly and the subassembly comprised of the die 10 and carrier 12 may be brought and held together by means of a jig (not shown). A suitable jig is shown and described in the above-referenced copending application Serial No. 67,294. Other suitable jigs are known to the art. A glass housing has been manufactured as follows. With the two subassemblies in contact as shown, a so-called "solder glass," in finely divided form (i.e., a "frit"), available from Corning Glass Co., Corning, New York, as "#7574 Hard Glass" also known as "Pyroceram" #45, was mixed with a vehicle comprised of nitrocellulose as a binder and amylacetate as a solvent, to form a paste. The ratio of glass to vehicle depends to a large extent on the viscosity of the paste which is desired. This paste was applied to the exterior surfaces of the die 10, carrier 12 and contact conductor 16, as shown in FIG. 1, with a brush. The mixture was then fired in situ at a temperature in the range approximately 700° C. to 750° C., in air, until a glaze appeared on the paste, indicating that the paste had been converted to vitreous glass. On continued firing at substantially the same temperature, a partially crystalline structure could be made to develop; this latter structure is a devitrified glass. During the firing step, the solvent evaporated and the binder burned off. This firing (and if desired, further firing) completed the fabrication of the housing 19.

Firing temperature may be achieved by any suitable means. Inductive heating has been employed with success. A suitable inductive heating process is illustrated and described in the above-referenced application Serial No. 67,294.

The housing 19 is hermetically sealed to the surface of the die 10, carrier 12 and contact conductor 16. Such housings, made as described above, are described and claimed in the above-referenced copending application Serial No. 69,792. The characteristics of this particular frit are that after being fired as described above, it forms a glass which is serviceable up to more than 700° C. This permits the subsequent connection of leads to the exposed surface of the base 12 with a solder which melts at a temperature below 700° C., and above the highest ambient temperature the finished device is expected to encounter in service, which is usually below 200° C. As is explained in said application, Serial No. 69,792, the fabrication temperature of this glass (700° C.–750° C.) is hot enough to dry the surfaces of the die 10 almost instantaneously, with the result that substantially all surface impurities are either driven off or immobilized practically instantaneously, and the finished device has long term surface reliability. As is also explained in said copending application, in the process of fabricating the housing 19 at temperatures in this range, some of the junctions 11 are damaged, or rendered useless by immobilizing impurities in a position where they have a deleterious effect on the junction, but there is practically no shrinkage of the usable yield following fabrication of the housing 19. Since it is the principal object of this invention to provide semiconductor devices having superior reliability, I prefer to fabricate the housing 19 by a process of the kind described above.

Figures 2, 3:
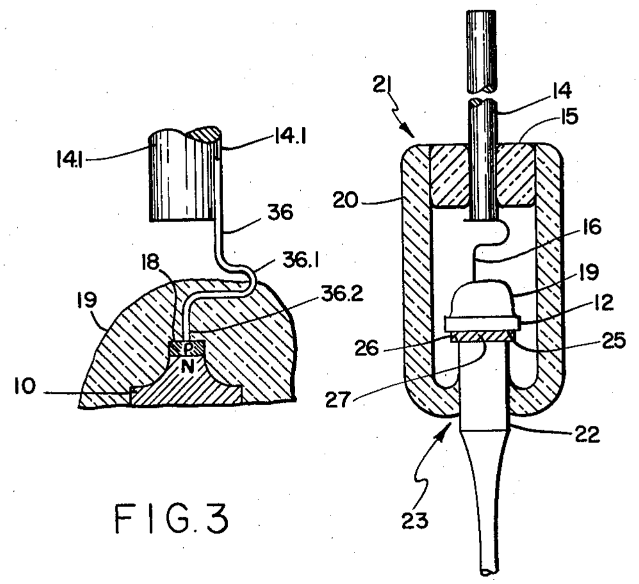
FIG. 2 illustrates in longitudinal section a completed diode according to the invention.
FIG. 3 shows an alternative subassembly structure for the diode of FIG. 1.

Referring now to FIG. 2, the assembly shown in FIG. 1 is placed in a second glass housing 20. This is a commercially available glass package for semiconductor devices, about ⅛ inch in external diameter and ⅜ inch in axial length. It is available in clear glass known as Corning Code 0120, Potash Soda Lead, having a thermal expansion coefficient of $89\times10^{-7}/°$ C. and a working temperature at 975° C. It is also available in black glass known as Corning Code 9361 opaque, having a thermal expansion coefficient of $92\times10^{-7}/°$ C. and a working temperature of 996. These are known as "soft" glasses. In either case, the housing 20 is furnished open at one end 21 and has a lead 22 sealed through the other end 23. This lead is a copper clad steel rod or wire known as "Dumet." The subassembly comprised of the housing 20 open at one end and the lead 22 sealed through the other end is sometimes known in the art as a "first seal."

The assembly shown in FIG. 1 is located in the first seal with the lower surface 25 of the carrier 12 confronting the upper surface 26 of the lead 22 inside the housing 20, and the glass bead 15 inside the housing 20 in a position to close the open end 21 thereof. A solder pellet 27 is interposed between the carrier 12 and the first seal lead 22. This pellet may be made of a lead-tin solder or a gold-tin solder, for example, having a melting point in the temperature range 220° C. to 250° C., approximately. The base 12 is then soldered to the first seal lead 22 by heating the parts in this relative disposition in a reducing atmosphere, as in a conveyor oven. The second seal, between the glass bead 15 and the housing 20, is made by the conventional techniques for making the second seal in this type of housing. Briefly, these techniques are to apply heat to the peripheral region where the bead 15 confronts the housing 20 near the open end 21. This is usually done by bringing an electrical resistance heater close to the outside of said region, to achieve a temperature in the range 800° C. to 1000° C. at the interface between the bead and the housing.

The finished diode according to FIGS. 1 and 2 is a device having an excellent reliability, combining the reliability due to the surface protection of the die 10 and rigidity of the contact between the die 10 and the contact 17 afforded by the first housing 19, and the reliability further contributed by the relatively softer glass second housing 20 which shields its contents from moisture and mechanical abuse. Intermittent and open contacts are eliminated. The finished device can be assembled into equipment with virtually no losses of such devices due to damage in the equipment assembly process. Due to the spacing between the housings 19 and 20, the second seal can be made at the working temperature of the second housing 20 (which may exceed 950° C.) without damage to the first housing 19 and its contents, or melting of the solder 27.

Figure 4:
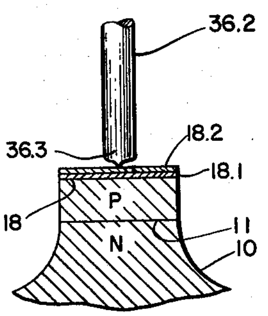
FIG. 4 illustrates an enlarged detail of the diode shown in FIG. 3.

FIGS. 3 and 4 illustrate an alternative subassembly structure comprising the semiconductor die, flexible contact electrode and first housing. Parts which are alike in FIGS. 1 and 3 bear the same reference character. In FIG. 3, the beaded lead electrode 14 has a flexible contact electrode 36 staked (or otherwise suitably attached) at one end to its side 14.1 near the lower end thereof. This flexible contact electrode has a spring portion 36.1 intermediate its end, and its free end 36.2 makes direct contact with the top surface 18 of the mesa portion of the die 10. The top surface 18 is clad with a layer 18.1 of nickel about 1 micron, or 40 millionths of an inch thick, and on top of this layer another layer 18.2 of gold about the same thickness, as is shown in FIG. 4. The free end 36.2 of the flexible contact electrode 36 makes an ohmic contact with the gold layer 18.2. Normally, this end may have a ragged edge 36.3 which may partly penetrate the gold layer 18.2. This will further insure a good ohmic contact. The glass housing 19 is formed around the die 10 and the free end 36.2 of the flexible contact electrode 36, including a portion of the spring portion 36.1, approximately to the mid-portion of the bight thereof. Thus the housing 19 contains portions of the spring contact electrode 36 which are disposed at an angle to each other, including the entire free end 36.2 thereof. In assembly, the parts are brought together until the end 36.2 of the contact electrode 36 has made a good ohmic metal-to-metal contact with the gold layer 18.2, and the housing is then formed as shown to assure that this contact will be maintained in service.

There is thus afforded, in each embodiment illustrated, a junction-type semiconductor diode in which all contacts to the semiconductor die are ohmic contacts. The embodiment of FIGS. 3 and 4 has an improved structure for achieving a metal-to-metal ohmic contact between the whisker electrode and the semiconductor body. The use of a glass which is servicable up to a temperature exceeding 700° C. for the first housing 19 permits the second or outer housing 20 to be fabricated of "soft" glass at a temperature in the range 800° C. to 1000° C. without the need to take special cooling steps and without risking destruction of the diode characteristics of the device enveloped in and protected by the first housing. The completed device according to the invention is capable of power dissipation up to and including one-half watt, while at the same time having and retaining extremely high reliability characteristics, both in junction protection and mechanical contact stability, in a package of the conventional outline and size dimensions mentioned above.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Semiconductor device comprising a body of electronic semiconductor material, first elongated resilient electrode means having one end in physical contact with a surface of said body, a glass housing intimately bonded to said surface and to the portion of said electrode means including said one end, said glass housing forming a hermetic seal around the region of said physical contact and constituting a rigid mass holding said one end of said first electrode means and said body in physical contact with each other, second elongated rigid electrode means connected at one end to said body, and second glass housing means surrounding and spaced from said first-named glass housing and said body, said second housing means being hermetically bonded to said first and second electrode means at intermediate portions of each with the free ends of said electrode means extending to the exterior of said second housing means, said second electrode means being of larger cross-section than said first electrode means and supporting said body firmly within said second housing, a resilient portion of said first electrode means extending between said glass housings, whereby said physical contact is stably independent of alterations in the physical dimensions of said second housing means.

2. Semiconductor device comprising a body of electronic semiconductor material, first elongated resilient electrode means having one end in physical contact with a surface of said body, a glass housing intimately bonded to said surface and to the portion of said electrode means including said one end, said glass housing forming a hermetic seal around the region of said physical contact and constituting a rigid mass holding said first electrode means and said body in physical contact with each other, second elongated relatively nonresilient electrode means connected at one end to the remaining end of said first electrode means, third elongated relatively nonresilient electrode means connected at one end to said body outside said glass housing, and second glass housing means surrounding and spaced from said first-named glass housing and said body, said second housing means being bonded to said second and third electrode means at intermediate portions of each with the free ends of said second and third electrode means extending to the exterior of said second housing means, said third electrode means being of larger cross-section than said first electrode means and supporting said body firmly within said second housing means, a resilient portion of said first electrode means extending between said rigid mass and said second electrode means, whereby said physical contact is stably independent of alterations in the physical dimensions of said second housing means.

3. Semiconductor device according to claim 1 wherein said body has at least one layer of metal bonded to said surface and said one end of said resilient electrode means is in physical contact with said layer.

4. Semiconductor device according to claim 1 wherein said body contains a diffused junction between a portion of P-type and a portion of N-type of said material, and said one end of said resilient electrode has a smooth surface in ohmic contact with said surface of said body.

5. Semiconductor device according to claim 2 wherein said resilient portion includes a U-shaped portion having its arms transverse to the remainder of the first electrode means.

6. Semiconductor device according to claim 5 wherein one of said arms is within said rigid means.

7. Semiconductor device according to claim 3 wherein said one end of said resilient electrode means penetrates said layer of metal.

References Cited by the Examiner

UNITED STATES PATENTS

| | | | |
|---|---|---|---|
| 2,688,110 | 8/54 | Domaleski et al. | 317—235 |
| 2,694,168 | 11/54 | North et al. | 317—234 |
| 2,827,597 | 3/58 | Lidow | 317—234 |
| 2,830,238 | 4/58 | Gudmundsen | 317—236 |
| 2,961,350 | 11/60 | Flaschen et al. | 317—234 |
| 3,022,452 | 2/62 | Williams et al. | 317—236 |
| 3,066,248 | 11/62 | Miller | 317—234 |

DAVID J. GALVIN, *Primary Examiner.*

JAMES D. KALLAM, *Examiner.*